(12) United States Patent
Spitzer et al.

(10) Patent No.: US 8,009,680 B2
(45) Date of Patent: Aug. 30, 2011

(54) SYSTEM AND METHOD FOR A PRIVATE WIRELESS NETWORK INTERFACE

(75) Inventors: Roy Leo Spitzer, Rockville, MD (US); Benjamin Levitan, Raleigh, NC (US)

(73) Assignee: Nextel Communications Inc., Reston, VA (US)

( * ) Notice: Subject to any disclaimer, the term of this patent is extended or adjusted under 35 U.S.C. 154(b) by 1345 days.

(21) Appl. No.: 11/192,125

(22) Filed: Jul. 29, 2005

(65) Prior Publication Data

US 2007/0060133 A1 Mar. 15, 2007

(51) Int. Cl.
*H04L 12/56* (2006.01)

(52) U.S. Cl. ...................................................... 370/401

(58) Field of Classification Search .................. 370/389, 370/342, 401
See application file for complete search history.

(56) References Cited

U.S. PATENT DOCUMENTS

| | | | | |
|---|---|---|---|---|
| 6,493,547 B1 * | 12/2002 | Raith | | 455/405 |
| 6,611,692 B2 | 8/2003 | Raffel et al. | | |
| 6,647,426 B2 | 11/2003 | Mohammed | | |
| 6,651,105 B1 * | 11/2003 | Bhagwat et al. | | 709/239 |
| 6,845,092 B2 * | 1/2005 | Vassilovski et al. | | 370/342 |
| 7,155,203 B2 * | 12/2006 | Brewer et al. | | 455/405 |
| 2002/0089951 A1 | 7/2002 | Hyun et al. | | |
| 2002/0131387 A1 | 9/2002 | Pitcher | | |
| 2002/0191557 A1 | 12/2002 | Chow et al. | | |
| 2002/0191635 A1 | 12/2002 | Chow et al. | | |
| 2003/0110508 A1 * | 6/2003 | Bridgelall | | 725/117 |
| 2004/0157625 A1 * | 8/2004 | Gheorghiu et al. | | 455/456.2 |
| 2005/0147069 A1 * | 7/2005 | Rink et al. | | 370/338 |
| 2006/0121902 A1 * | 6/2006 | Jagadeesan et al. | | 455/439 |
| 2006/0268902 A1 * | 11/2006 | Bonner | | 370/401 |
| 2007/0002787 A1 * | 1/2007 | Narayanan et al. | | 370/328 |
| 2008/0130666 A1 * | 6/2008 | Kawamoto et al. | | 370/401 |
| 2008/0293413 A1 * | 11/2008 | Sharif-Ahmadi et al. | | 455/435.1 |

FOREIGN PATENT DOCUMENTS

WO  WO 00/70891  11/2000
WO  WO 2004/040938 A1  5/2004

* cited by examiner

*Primary Examiner* — Dang T Ton
*Assistant Examiner* — Kevin Lee (57) ABSTRACT

A private wireless network interface provides wireless signaling and protocols of a wireless macro network to allow a consumer to operate over a private wireless network. The private wireless network interface receives wireless signals compatible with a wireless macro network and transmits the signals over a broadband connection to a wireless service provider's wireless macro network. The private wireless network interface allows the use of mobile stations which are compatible with a wireless macro network to operate in a residence and have the signals backhauled over the residence's broadband connection. The private wireless network interface can provide wireless macro network coverage in any location with some type of coupling to the Internet.

17 Claims, 6 Drawing Sheets

SYSTEM AND METHOD FOR A PRIVATE WIRELESS NETWORK INTERFACE

BACKGROUND OF THE INVENTION

Decreasing costs of wireless communications, such as cellular communications, has resulted in many consumers relying upon wireless communications as their primary means of telephonic communications. Some consumers have completely switched their telephonic communications from landline (e.g., through a local exchange carrier "LEC" or a local phone company) to wireless communications. In addition to the decreasing costs of wireless communications, this switch is due to the convenience of having a single telephone and telephone number for all communications, and the portability associated with a telephone number fixed to a geographical location.

Although many consumers desire the simplicity afforded by using wireless communications in place of landline communications, not all consumers have this option. Specifically, many consumers reside in areas where their wireless service provider's service area (herein referred to as a "wireless macro network") does not provide adequate coverage. In some areas the wireless macro network may provide adequate coverage, however, due to the attenuation of wireless signals by the structure of the consumer's residence, the consumer cannot obtain adequate coverage within the residence.

Even when consumers are able to obtain adequate coverage in their homes, they may face difficulties in obtaining wireless coverage when located in areas away from their homes. Specifically, there are currently a number of different wireless communication standards implemented by different wireless carriers. Many of these wireless communication standards are incompatible with each other. For example, a CDMA mobile station cannot communicate with a wireless macro network which operates using iDEN or GSM technology. Consumers typically face this incompatibility problem when traveling between the United States, where many wireless carriers operate CDMA wireless macro networks, and Europe, where GSM is the prevailing technology for wireless macro networks.

Even when a consumer has a mobile station which operates in accordance with a particular technology, if there is not a roaming agreement between the consumer's wireless network operator and the operator of the wireless macro network where the consumer is currently located, the consumer will not be able to communicate over the visited wireless macro network. Moreover, even when there are roaming agreements exist, the cost of roaming may be extremely expensive.

Accordingly, it would be desirable to provide systems and methods for allowing consumers to use their existing mobile stations in their residences regardless of whether a signal from the wireless macro network can be received within the residence. Additionally, it would be desirable to provide systems and methods for allowing consumers to use their existing mobile stations when a consumer is located in an area which has coverage from a wireless macro network which operates using an incompatible technology, in which the consumer's wireless network operator does not have a roaming agreement with the wireless macro network operator, or when roaming agreements result in high per minute fees for such roaming.

SUMMARY OF THE INVENTION

A private wireless network interface is provided. The private wireless network interface includes a wireless macro network signaling interface, a broadband network signaling interface, and a processor coupled between the wireless macro network signaling interface and the broadband wireless network signaling interface. The processor converts a payload portion of a packet received by the wireless macro network signaling interface into a session initiation protocol (SIP) packet, when the payload portion of the first packet contains signaling information. The processor also encapsulates a payload portion of the SIP packet in a second packet, and transmits the second packet to a mobility server of a wireless macro network.

A method for a private wireless network interface is also provided. The method includes receiving a first packet formatted in a first protocol, the first protocol being a wireless macro network protocol. Next, it is determined whether a payload portion of the first packet contains signaling information. When it is determined that the payload portion of the first packet contains signaling information, the payload portion of the first packet is converted into a session initiation protocol (SIP) packet. A payload portion of the SIP packet is encapsulated in a second packet, the second packet being formatted in a second protocol. The second packet is transmitted from the private wireless network interface to a mobility server of a wireless macro network.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
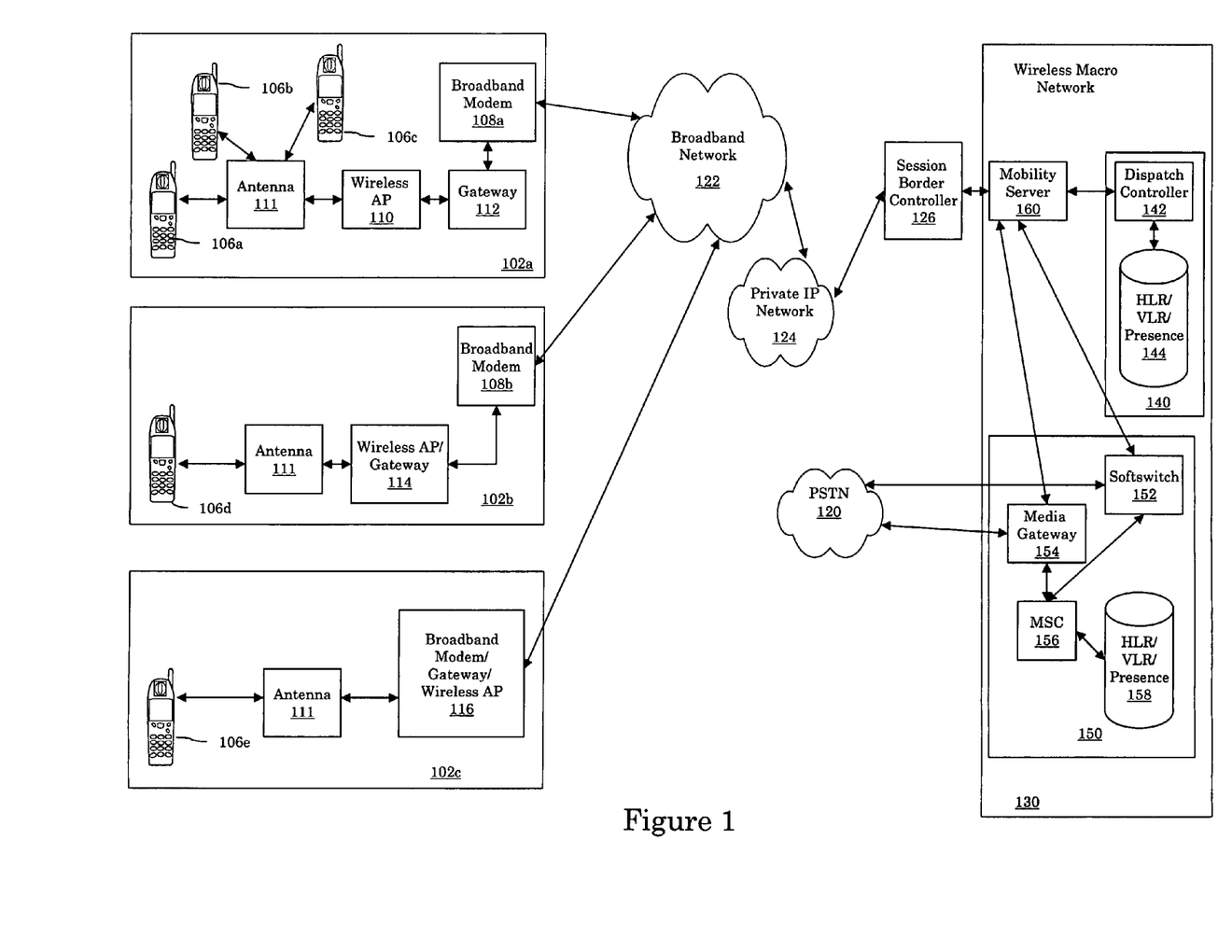
FIG. 1 illustrates a block diagram of an exemplary communication system in accordance with the present invention.

FIG. 1 illustrates a block diagram of an exemplary communication system. The communication system includes a number of residences 102a-102c. Each residence includes one or more mobile stations 106a-106e. The mobile stations 106a-106e operate using the signaling and protocols of the wireless macro network 130. Accordingly, a subscriber can carry the mobile station away from the residence and use it on the wireless macro network. As used herein the term mobile station is intended to cover conventional wireless telephones, wireless computers, wireless personal digital assistants (PDAs), and the like.

The broadband modem portion of element 108 can be any type of conventional broadband modem such as a cable modem compliant with DOCSIS standard or a digital subscriber line (DSL) modem compliant with the G.lite standard. Alternatively, or additionally, wireless broadband connections, such as satellite or metropolitan area networks (e.g., WiMax networks), can be used. The particular type of broadband modem will depend upon the type of technology employed by the broadband network 122.

Each residence 102a-c also includes means for connecting the mobile stations 106a-e to a wireless macro network 130. The means for connecting mobile stations to the wireless macro network 130 includes an antenna system 111, wireless access point 110 and a gateway 112. The wireless access point provides RF signals for communication with the mobile station 106a. As described in more detail below, the gateway 112, acts a base transceiver station (BTS), and converts the signals received from the mobile station 106a into an appropriate format for transmission through the broadband network 122 to the wireless macro network 130. Residence 102b includes a broadband modem 108b and a device 114 which combines the functions of the wireless access point and the gateway, while residence 102c includes a device 116 which combines the functions of a broadband modem, wireless access point and gateway. Additionally, a computer, such as a desktop or laptop, can include any or all of the functionality of the broadband modem, gateway or wireless access point. For ease of explanation, and not limitation, the provision of wireless communications within a particular residence by a access point/gateway will be referred to as a private wireless network, and the functionality provided by the combination of the access point and gateway will be referred to as a private wireless network interface.

Communications which originate from mobile stations 106a-e are routed through the broadband network 122, a private IP network 124, and a session border controller 126 to the wireless macro network 130. The use of a private IP network 124 depends upon implementation, and may be omitted. Although illustrated outside of the wireless macro network 130, the private IP network 124 and the session border controller 126 can be part of the wireless macro network 130. The private IP network 124 is a transmission medium for communications between the residences 102a-c and the wireless macro network 130 and operates in a conventional manner. The session border controller 126 acts as a firewall to protect the wireless macro network 130 from unauthorized access.

For purposes of explanation, and not limitation, the illustrated wireless macro network 130 is based upon an iDEN communications system such as that owned and operated by Nextel Communications, Inc. of Reston, Va. However, the wireless macro network 130 can be any type of wireless macro network operated by any service provider. The wireless macro network will operate using the same protocols as those used by the mobile stations 106a-e. The wireless macro network 130 includes a dispatch portion 140 and an interconnect portion 150. Dispatch communications are commonly known as a walkie-talkie or push-to-talk type of communications such as Nextel's service identified by the trade name Direct Connect. Interconnect communication is what is conventionally considered "cellular communications". For a number of reasons which are not relevant to the present application, dispatch calls are handled differently by the network than interconnect calls.

The dispatch portion 140 includes a dispatch controller 142 which operates in a conventional manner to control dispatch communications. The dispatch portion also includes a home location register (HLR)/visitor location register (VLR)/Presence server 144, which operates in a conventional manner for tracking the location, i.e., the point of attachment to the network, of mobile stations based on mobile station registration messages. FIG. 1 illustrates the HLR/VLR/Presence server as a single network element for ease of explanation, and not limitation. The HLR, VLR and Presence server can be provided as separate network elements.

The interconnect portion 150 includes a softswitch 152, media gateway 154, mobile switching center (MSC) 156 and HLR/VLR/Presence server 158. HLR/VLR/Presence server 158 is illustrated as a single network element for ease of explanation, and not limitation. Accordingly, the HLR, VLR and Presence server functionality can be provided as separate network elements. The softswitch 152 operates as a conventional softswitch by switching call related signaling between various endpoints, e.g., calls to and from the public switched telephone network (PSTN) 120 and calls routed through the mobility server 160. The media gateway 154 operates as a conventional media gateway by switching call data, such as voice data, and performing any necessary signaling and protocol conversion. The media gateway 154 can include voice coders ("vocoders") for changing voice coding from the pulse code modulation (PCM) used in the PSTN 120 to an appropriate voice coding used by the wireless macro network, such as the vector sum excited linear predictive (VSELP) coder used in iDEN networks. The MSC operates in a conventional manner to switch communications between various BTSs, and the VLR/Presence server acts in a conventional manner as described above.

The mobility server 160 routes all traffic which originates from the private wireless networks 102. Specifically, the mobility server 160 determines whether a communication from one of the private wireless networks is a dispatch or an interconnect communication. The mobility server 160 then routes the communication to the appropriate processing portion of the wireless macro network. Because the mobility server 160 routes all communications between the wireless macro network and the private wireless networks 102, an address associated with the mobility server 160 will be used to route communications between the networks. Specifically, communications which originate within the wireless macro network destined for a mobile station located in a private wireless network would use an address associated with the mobility server 160 as the destination address of the message. Using information in the message, for example additional address information or other special signaling identifying the intended mobile station, the mobility server 160 transmits the communication to the appropriate private network 102a-102c. Similarly, communications which originate from a mobile station in one of the private networks 102a-102c are addressed with an address associated with the mobility server 160 as the destination address. An address or other identifying information of the actual address of the destination mobile station can also be included in the message.

Although not illustrated, the mobile stations 106a-e can use the private wireless networks for data communication. For example, the mobile station may subscribe to a particular type of data communication application through the wireless macro network. In this case the application would only work properly when it is routed through the wireless macro network. Accordingly, even though the data communication could occur through the broadband network 122 itself, the wireless macro network may format the data appropriately for the mobile device, and hence, use of the wireless macro network for this purpose is desired.

If the broadband network 122 is a cable network, the broadband modem can include a media terminal adapter (MTA) for connection of a landline telephone to the cable network. Accordingly, the cable network will have components for providing voice communications between the landline telephone and the PSTN, using a link between the cable network and the PSTN (not illustrated), as is conventional in the art.

Figure 2:
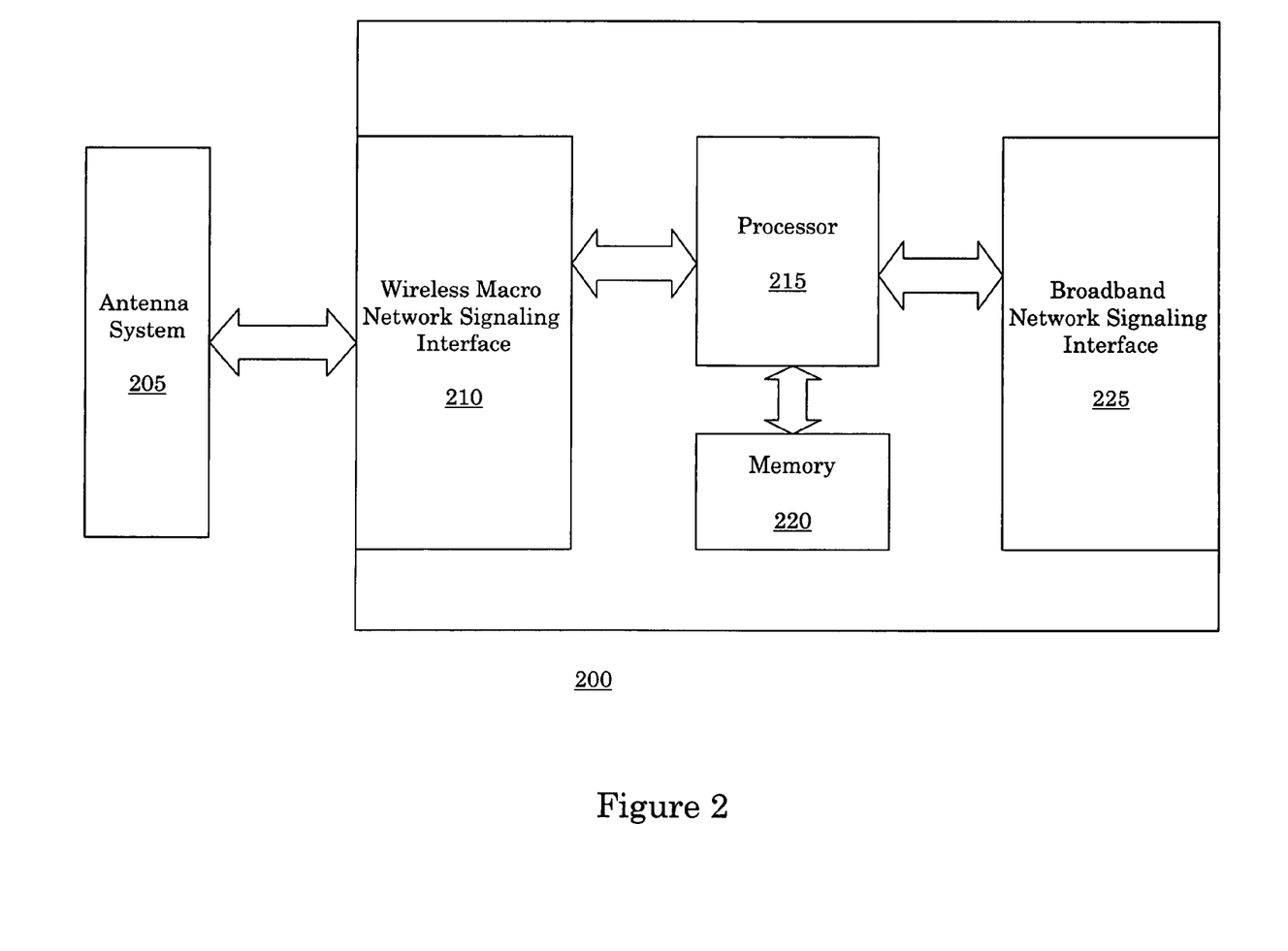
FIG. 2 illustrates a block diagram of an exemplary private wireless network interface in accordance with the present invention.

FIG. 2 illustrates a block diagram of an exemplary private wireless network interface 200, which as described above in connection with FIG. 1, corresponds to the functionality of the wireless access point and gateway. The private wireless network interface includes an antenna system 205, a wireless macro network signaling interface 210, a processor 215, a memory 220 and a broadband network signaling interface 225. The antenna system 205 corresponds to the access point described above in connection with FIG. 1, and can include one or more antennas designed for frequencies typically used in wireless macro networks, such as 800, 900 and 1900 MHz frequency bands. The wireless macro network signaling interface 210 provides all of the signaling that a mobile station operating on the macro network would require for communications. The wireless macro network signaling interface 210 can operate using any type of multiple access technology employed by wireless macro networks such as CDMA, FDMA, OFDM, TDMA, or any combination thereof. Additionally, the wireless macro network signaling interface 210 can operate using any one of the protocols used by a wireless macro network such as an integrated Digital Enhanced Network (iDEN), IS-136 (a TDMA-based standard), IS-95 (a CDMA-based standard), Global System for Mobile communications (GSM), Cellular Digital Packet Data (CDPD), General Packet Radio System (GPRS), Enhanced Data Rates for Global Evolution (EDGE), Single Carrier Radio Transmission Technology (1xRTT), wideband CDMA (W-CDMA), Evolution-Data Only (EV-DO), or cdma2000 protocol.

The processor 215, in conjunction with memory 220, converts signaling between the wireless macro network signaling and the broadband interface signaling. Additionally, the processor 215 can perform similar functionality to that of the Packet Control Function (PCF) defined for Third Generation (3G) wireless networks. Processor 215 can be a microprocessor, hard-wired logic, ASIC, FPGA, or the like. Memory 220 can be any type of memory such as a hard disk, flash memory, random access memory (RAM), read only memory (ROM) and the like. The memory 220 can store a program for operating the processor, mobile station registration information, and the like. The broadband signaling interface provides all signaling that is required for communications with the broadband network.

Figure 3:
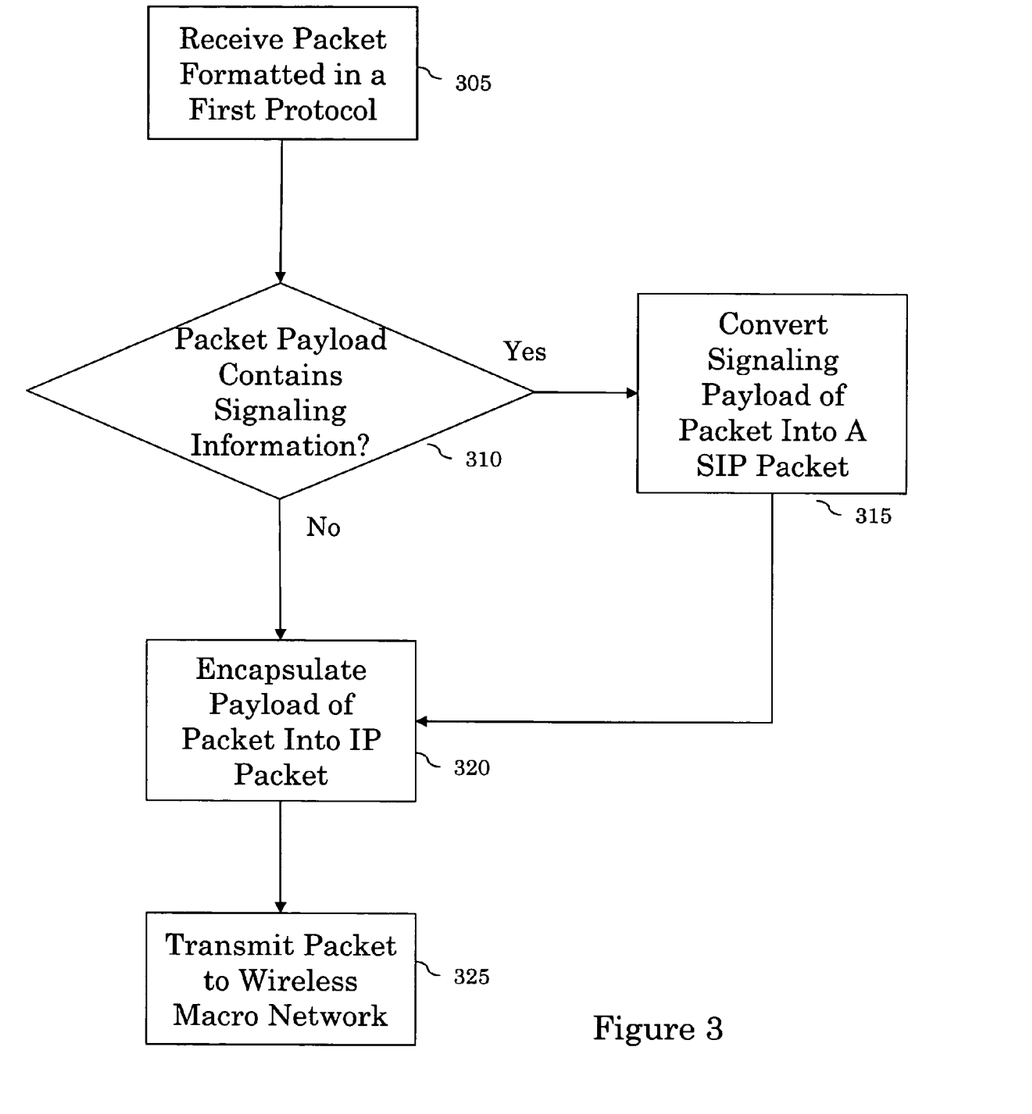
FIG. 3 illustrates an exemplary method for transmitting packets from a private wireless network interface to a wireless macro network in accordance with the present invention.

FIG. 3 illustrates an exemplary method for transmitting packets from a private wireless network interface to a wireless macro network in accordance with the present invention. In accordance with the present invention, the private wireless network interface converts the payload of the signaling packets into corresponding SIP packets and encapsulates the payload of the SIP packets in IP transport packets. All non-signaling packets, such as voice or data packets, are not converted, but the payloads are encapsulated in IP transport packets, such as RTP packets.

The wireless macro network signaling interface receives a packet formatted in a first protocol, such as the protocol used in the iDEN network, and forwards the packet to the processor (step 305). The processor determines whether a payload portion of the received packet contains signaling information (step 310). If the payload portion of the received packet contains signaling information ("Yes" path out of decision step 310), then the processor converts the payload portion of the packet from the first protocol into one or more SIP packets. After a payload of a packet containing signaling information has been converted into a SIP packet (step 315), or if the packet does not contain signaling information ("No" path out of decision step 310), then the payload portion of the packet is encapsulated into one or more IP packets (step 320). The processor then transmits, via the broadband network signaling interface, the one or more IP packets to the wireless macro network (step 325).

Figure 4:
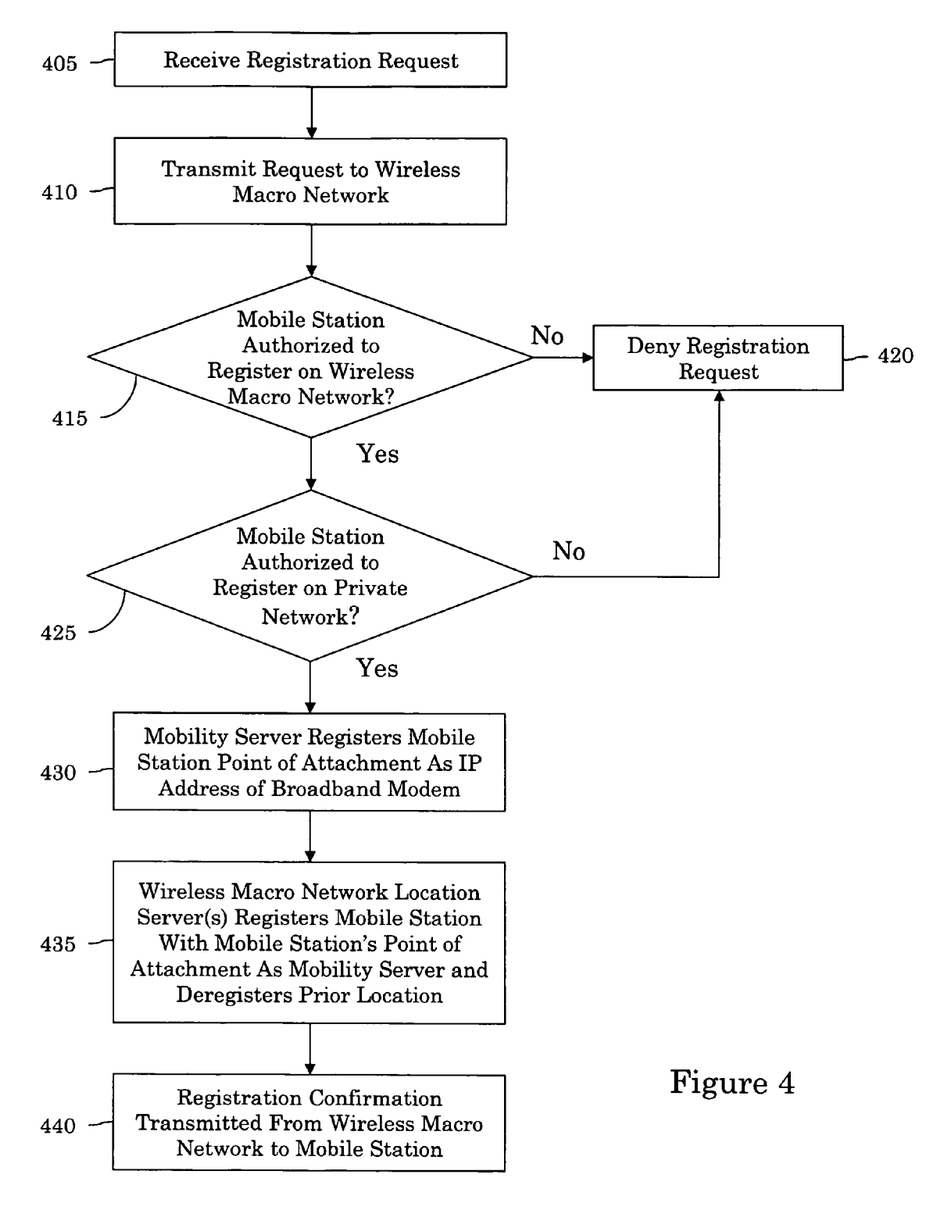
FIG. 4 illustrates an exemplary method for registering a mobile station on a private wireless network in accordance with the present invention.

FIG. 4 illustrates an exemplary method for registering a mobile station on a private wireless network. The private wireless network interface receives a registration request from a mobile station (step 405) and transmits the request to the wireless macro network (step 410). The wireless macro network determines whether the mobile station is authorized to register with the wireless macro network (step 415). A mobile station will be authorized to register with the wireless macro network if the mobile station has a subscription with the service provider of the wireless macro network. This authorization can be performed using the mobile station's electronic serial number (ESN), and the like, as is conventional for mobile station registrations.

If the mobile station is not authorized to register with the wireless macro network ("No" path out of decision step 415), then the wireless macro network will deny the registration request (step 420). Denial of the registration request can involve either sending a denial message to the mobile station or not sending a message. When registration is denied and a message is not sent, the mobile station will determine that registration has been denied by not having received a response to the registration request for more than a predetermined amount of time.

If the mobile station is authorized to register with the wireless macro network ("Yes" path out of decision step 415), then the wireless macro network determines whether the mobile station is authorized to register with the private wireless network (step 425). Alternatively, this authorization step can be performed by the private wireless network interface. Because the private wireless network interface uses a consumer's broadband connection for communicating with the wireless macro network, the consumer will desire limits on which mobile stations can access the consumer's private wireless network interface. Accordingly, the consumer can set the private wireless network interface to accept registration attempts only from certain mobile stations based on a mobile station identifier.

When the authorization portion of the registration process is performed by the private wireless network interface, the authorized mobile station identifications can be set by programming the private wireless network interface with the appropriate mobile station identifiers, such identifiers can be stored in the memory of the private wireless network interface. When the authorization portion of the registration process is performed by the wireless macro network, the mobile station identifiers are provided to the service provider of the wireless macro network which will store an association of the mobile station identifiers with the private wireless network interface identifier.

If the mobile station is not authorized to register with the private wireless network ("No" path out of decision step 425), then the registration request is denied (step 420). Denial of the registration request can occur in a similar manner to that described above in connection with the mobile station registering with the wireless macro network.

If, however, the mobile station is authorized to register with the private network ("Yes" path out of decision step 425), then the mobility server registers the mobile station's point of attachment as the IP address of the broadband modem (step 430). The macro network location servers, such as a home location register (HLR) and VLR, register the mobile station with the mobile station's current point of attachment as the mobility server and deregisters the mobile station's prior point of attachment (step 435). A registration confirmation message is transmitted from the wireless macro network to the mobile station (step 440). Registering the mobile station's current point of attachment as the IP address of the broadband modem, allows communications destined for the mobile station to be routed to the broadband modem. Accordingly, when communications destined for the mobile station are received by the wireless macro network, the location register will show that the mobile station is currently located at the broadband modem.

The registration process described above in connection with FIG. 4 will occur when the mobile station is powered-on, has roamed into the private wireless network while not engaged in communications, and as part of a handover procedure. Once the mobile station has registered with the wireless macro network with its current point of attachment as the location of the private wireless network, the mobile station can complete the handover process by communicating only with the private wireless network interface of the private wireless network and releasing the channel used on the wireless macro network.

Figure 5:
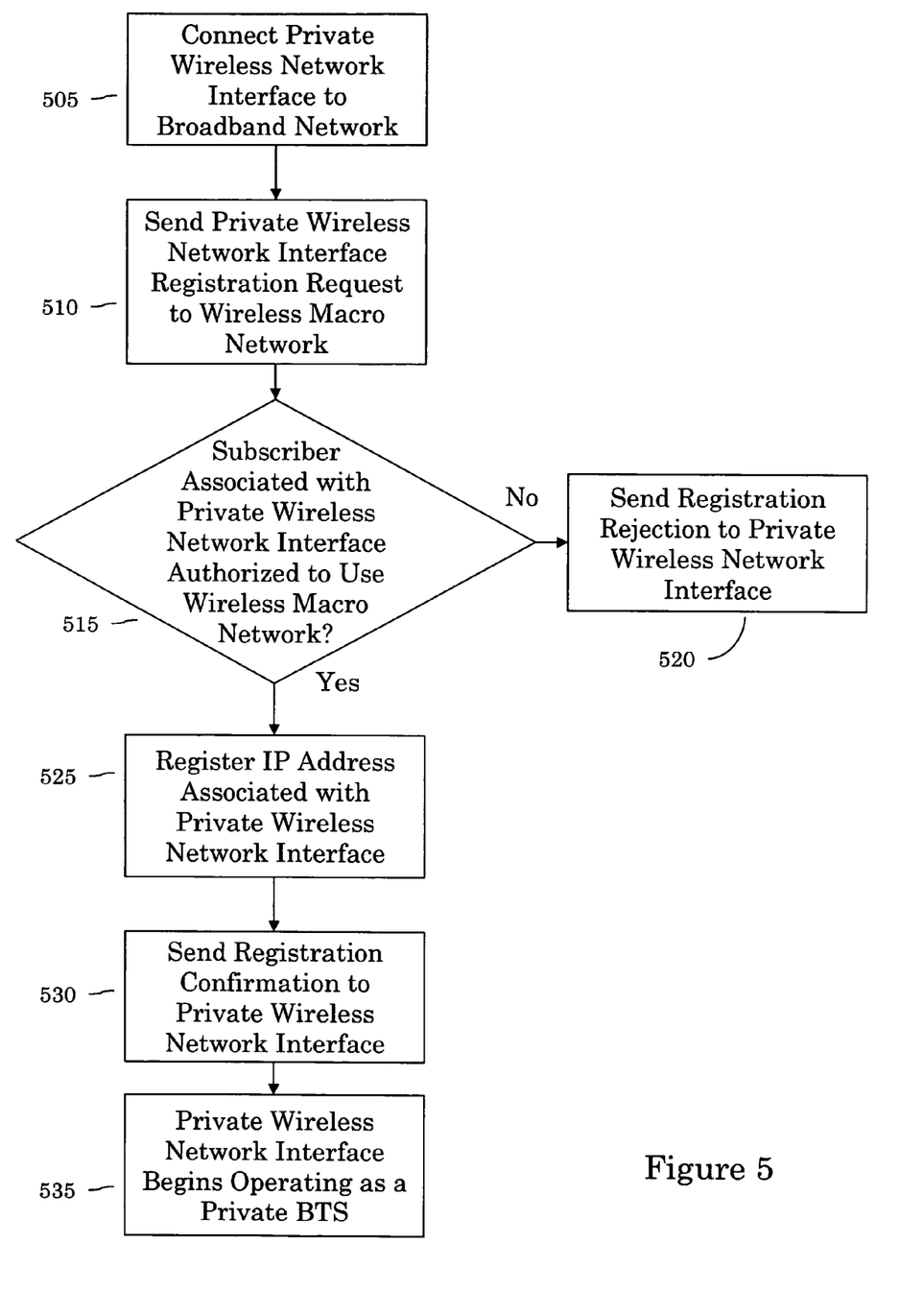
FIG. 5 illustrates an exemplary method for registering a private wireless network interface with a wireless macro network in accordance with the present invention.

FIG. 5 illustrates an exemplary method for registering a private wireless network interface with a wireless macro network. This method will occur when a consumer first places the private wireless network interface into service, after a power failure, and the like. This process can also allow a consumer to take the private wireless network interface to different locations, such as on business trips or on vacation, and still use the functionality of the disclosed system.

The private wireless network interface is connected to a broadband network (step 505), and sends a registration request to the wireless macro network (step 510). The wireless macro network determines whether a subscriber associated with the private wireless network interface is authorized to access the wireless macro network (step 515). Each private wireless network interface is assigned a unique identification number (e.g., its MAC identifier) which is used by the subscriber associated with the wireless macro network to identify whether the private wireless network interface is authorized to access the wireless macro network. If a subscriber associated with the private wireless network interface is not authorized to access the wireless macro network ("No" path out of decision step 515), then the wireless macro network sends a registration rejection message to the private wireless network interface (step 520).

If a subscriber associated with the private wireless network interface is authorized to access the wireless macro network ("Yes" path out of decision step 515), then the IP address associated with the private wireless network interface is registered in the wireless macro network (step 525). Because the broadband modem is located between the private wireless network interface and the broadband network, the broadband modem will typically have a public IP address while the private wireless network interface will have a private IP address. Accordingly, the IP address associated with the private wireless network interface which is registered with the wireless macro network would be the public IP address. Therefore, the broadband modem (or a router if one is employed) would perform network address translation (NAT) to forward packets between the private wireless network interface and the broadband network. A registration confirmation message is sent from the wireless macro network to the private wireless network interface (step 530), and the private wireless network interface can then begin operating as a private BTS (step 535).

Figure 6:
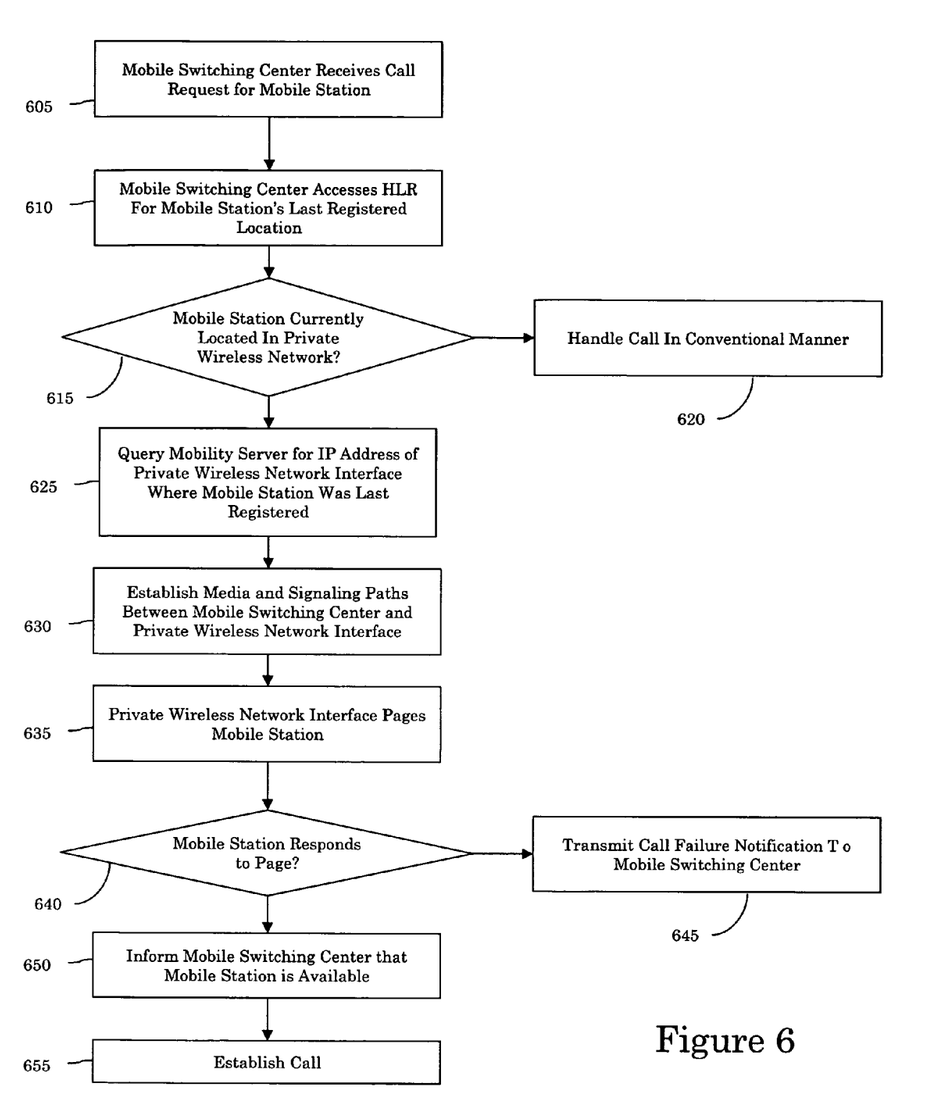
FIG. 6 illustrates an exemplary method for setting up a call destined for a mobile station located within a service area of a private wireless network interface in accordance with the present invention.

FIG. 6 illustrates an exemplary method for setting up a call destined for a mobile station located within a service area of a private wireless network interface. When the mobile switching center receives a call for a mobile station (step 605), the mobile switching center accesses its HLR for the mobile station's last registered location (step 610). The mobile switching center then determines whether the mobile station's last registered location was in a private wireless network (step 615). If the mobile station's last registered location was not in a private wireless network ("No" path out of decision step 615), then the mobile switching center handles the call in a conventional manner (step 620).

If the mobile station's last registered location is within a private wireless network ("Yes" path out of decision step 615), then the mobility server is queried to determine the IP address of the private wireless network interface where the mobile station was last registered (step 625). The mobility server establishes media and signaling paths between the mobile switching center and the private wireless network interface (step 630). The private wireless network interface then pages the mobile station (step 635), and determines whether the mobile station has responded to the page (step 640). If the mobile station has not responded to the page ("No" path out of decision step 640), then the private wireless network interface transmits a call failure notification to the mobile switching center (step 645). However, if the mobile station responds to the page ("Yes" path out of decision step 640), then the private wireless network interface informs the mobile switching center that the mobile station is available (step 650), and the call is established (step 655).

Although exemplary embodiments of the present invention have been described above as providing wireless macro network coverage to consumer's residence, the present invention is not limited to such. Specifically, the present invention can be employed in any place where there is a connection to the internet. For example, when a consumer is traveling outside of the coverage area of their wireless macro network provider (or in the roaming area of their wireless macro network provider where higher per minute usage charge may apply), the consumer can connect the private wireless network interface to a broadband connection and use their existing mobile station, while being billed at home network rates regardless of the geographical location of the mobile station and the private wireless network interface. Similar to the embodiments described above, when the private wireless network interface is connected to the internet, it establishes a SIP-session with the consumer's wireless macro network, which maps the consumer's SIP IP address to the consumer's mobile station identifier. Accordingly, calls destined for the consumer's mobile station will be transmitted by the wireless macro network to the consumer's private wireless network interface, and in turn, to the consumer's mobile station.

Moreover, the private wireless network interface can be used in a motor vehicle, including trains or airplanes that provide high speed internet access. In this scenario, the private wireless network interface would connect to the macro wireless network via another wireless network, such as a WiMax, GPRS or EV-DO network. Additionally, the private wireless network interface can be used in any scenario where there is access to the internet, such as commonly available 802.11 hotspots.

The present invention is not limited to a private wireless network interface supporting a single consumer. The private wireless network interface can support a number of different consumers, using the same or different wireless technologies. The amount of transmission power output from the private wireless network interface can be adjusted based upon the desired coverage area (accounting for any location regulations relating to the operation of unlicensed wireless networks over licensed bands). There are a number of scenarios where supporting a number of different customers can be useful. For example, if a company has some offices located in areas which are not within the service area of a particular wireless macro network, one or more private wireless network interfaces can be setup in these offices, thereby allowing the office workers to maintain telephone numbers assigned by the particular wireless macro network operator (including country and/or area codes which are local to the company's offices located within the service area), and not incurring long distance charges for calls to or from the office workers' mobile stations.

Supporting a number of consumers can also be useful for large events. For example, a sporting event or trade show may attract consumers with mobile stations which operate according wireless macro network air-interface technologies which do not have service in the area where the sporting event or trade show occurs. Accordingly, the private wireless network interface can be setup in such an area to support these mobile stations. Because the private wireless network interface only requires a broadband connection, the private wireless network interface can be setup with only minimal cost. Additionally, the operator of the private wireless network can obtain revenue from the consumers who use the private wireless network interface.

The private wireless network interface can be located in hotel rooms, thereby allowing a subscriber to use their existing wireless macro network mobile station over the hotel's high speed internet connection. Moreover, a hotel operator can employ a centralized private wireless network interface, and distribute antennas throughout the hotel. It will be recognized that instead of a hotel, the present invention can be implemented on a cruise ship.

The private wireless network interface of the present invention is also useful for wireless network operators desiring to add network coverage in new areas. For example, private wireless network interface can be used by the wireless network operator as a permanent solution, a test of a potential market, a temporary fix for a damaged area, a temporary solution when high traffic loads are expected in a particular area for a special event or in the case of a disaster recovery. The private wireless network interface can also be used as a permanent or temporary solution for the wireless network operator who desires to operate in a market where they do not have a license, who desires to operate in a distant market and they do not wish to expend large sums of money to connect the two markets. The present invention can also be used as a permanent or temporary solution to bridge two markets or as a permanent solution to provide subscribers operating in a market that has a different air interface technology.

The present invention can also be used to implement optimal routing, which enables a call from subscriber who are roaming to connect to another subscriber who is roaming in the same roaming area without routing the call to the home network and back to the roaming area, such as international roaming. Accordingly, the present invention can allow network operators to reduce backhaul costs and provide subscribers with their home network dialing and features regardless of their actual geographic location.

When the private wireless network interface supports a number of different technologies, SIP sessions are established to each wireless macro network which are the home systems for each of the consumers. To support multiple different technologies, the wireless network interface should include a separate wireless macro network signaling interface for each different technology.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a private wireless network interface comprising:

establishing, by the private wireless network interface, communication with a broadband network;

transmitting, by the private wireless network interface through the broadband network, a registration request to register the private network interface to a wireless macro network comprising a unique identifier of the private wireless network interface and a unique identifier of a mobile station associated with the private wireless network interface, wherein the wireless macro network provides wireless communication services according to a first wireless communication protocol; and providing, by the private wireless network interface, wireless communication services according to the first wireless communication protocol to the mobile station, when the private wireless network interface receives a registration response from the wireless macro network indicating that the mobile station is authorized to access the wireless macro network;

receiving, by the private wireless network interface, a first packet formatted in a first wireless communication protocol, determining whether a payload portion of the first packet contains signaling information;

converting the payload portion of the first packet containing signaling information into at least one session initiation protocol (SIP) packet, when it is determined that the payload portion of the first packet contains the signaling information;

encapsulating the payload portion of the first packet into at least one second packet, wherein the at least one second packet is formatted in a second protocol; and transmitting to a mobility server of the wireless macro network, the at least one second packet, wherein the at least one second packet is transmitted using the second protocol through the broadband network, wherein the payload portion of the first packet is encapsulated and transmitted only when the first packet was received from the mobile station which is authorized to access the private wireless network interface, and authorization to access the private wireless network interface is based upon a registration comprising:

receiving, by the private wireless network interface, a registration request from the mobile station;

transmitting, by the private wireless network interface, the registration request to the wireless macro network;

receiving, by the private wireless network interface, the registration response from the wireless macro network;

determining, by the private wireless network interface, whether the mobile station is authorized to register with the private wireless network interface when the registration response confirms that the mobile station is registered with the wireless macro network; and registering the mobile station with the private wireless network interface when the registration response confirms that the mobile station is registered with the wireless macro network and the mobile station is authorized to register with the private wireless network interface.

2. The method of claim 1, wherein the second protocol is an Internet Protocol.

3. The method of claim 1, wherein when it is determined that the payload portion of the first packet does not contain the signaling information, the method further comprises:
encapsulating the payload portion of the first packet in the at least one second packet; and
transmitting the at least one second packet from the private wireless network interface to the mobility server of the wireless macro network.

4. The method of claim 3, wherein the at least one second packet is a realtime protocol (RTP) packet.

5. The method of claim 1, wherein authorization by the macro network comprises:
registering, by the mobility server, the mobile station's current point of attachment as an IP address associated with the private wireless network interface;
registering, by a location register, the mobile station's current point of attachment as an address associated with the mobility server; and
transmitting an authorization message from the wireless macro network to the private wireless network interface.

6. The method of claim 1, wherein the first protocol is an iDEN, IS-136, IS-95, GSM, CDPD, GPRS, EDGE, 1xRTT, W-CDMA, or cdma2000 air interface protocol.

7. A private wireless network interface comprising:
a wireless macro network signaling interface;
a broadband network signaling interface; and
a processor coupled between the wireless macro network signaling interface and the broadband network signaling interface, configured to:
establish communication with a broadband network through the broadband network signaling interface;
transmit a registration request to a wireless macro network through the wireless macro network signaling interface comprising a unique identifier of the private wireless network interface and a unique identifier of a mobile station associated with the private wireless network interface, wherein the wireless macro network provides wireless communication services according to a first wireless communication protocol; and
provide wireless communication services according to the first wireless communication protocol to the mobile station, when the private wireless network interface receives a registration response from the wireless macro network indicating that the mobile station is authorized to access the wireless macro network; convert a payload portion of a first packet received by the wireless macro network signaling interface from the mobile station into at least one session initiation protocol (SIP) packet when the payload portion of the first packet contains signaling information,
encapsulate the payload portion of the first packet into at least one second packet, and
transmits the at least one second packet to a mobility server of the wireless macro network, and
the processor performs a registration of the mobile station with the wireless macro network prior to transmitting packets received from the mobile station on the wireless macro network signaling interface, the processor further configured to
receive a registration request from the mobile station;
transmit the registration request to the wireless macro network;
determine whether the mobile station is authorized to register with the private wireless network interface when a registration response from the wireless macro network confirms that the mobile station is registered with the wireless macro network; and
register the mobile station when the registration response confirms that the mobile station is registered with the wireless macro network and the mobile station is authorized to register with the private wireless network interface.

8. The private wireless network interface of claim 7, wherein when the payload portion of the first packet does not contain the signaling information, the processor encapsulates the payload portion of the first packet in the at least one second packet and transmits the at least one second packet to the mobility server of the wireless macro network.

9. The private wireless network interface of claim 8, wherein the at least one second packet is a real-time protocol (RTP) packet.

10. The private wireless network interface of claim 7, wherein the wireless macro network signaling interface operates in accordance with at least one of FDMA, TDMA, CDMA, and OFDM multiple access technology.

11. The private wireless network interface of claim 7, wherein the wireless macro network signaling interface operates in accordance with at least one of iDEN, IS-136, IS-95, GSM, CDPD, GPRS, EDGE, 1xRTT, W-CDMA, and cdma2000 air interface protocol.

12. The private wireless network interface of claim 7, wherein the private wireless network interface is located in a residence.

13. The private wireless network interface of claim 7, wherein the private wireless network interface is located in a hotel room and the wireless macro network signaling interface supports more than one wireless macro network air interface technology.

14. The private wireless network interface of claim 7, wherein the private wireless network interface allows a user to be charged at home network rates regardless of the geographical location of the private wireless network interface.

15. The private wireless network interface of claim 7, wherein the wireless macro network signaling interface communicates over an air-interface in accordance with a first wireless macro network protocol, and the private wireless network interface is located in a geographical area where wireless macro network coverage is not provided for the first wireless macro network protocol.

16. The private wireless network interface of claim 15, wherein a communication station, which communicates with the wireless macro network signaling interface over the air-interface, is assigned a telephone number, wherein the telephone number is associated with a different geographical area than the geographical area where the private wireless network interface is located.

17. The private wireless network interface of claim 16, wherein communications which originate in the different geographical area do not incur long distance charges when communicating with the communication station.

* * * * *